(12) United States Patent
Yang et al.

(10) Patent No.: US 12,521,793 B2
(45) Date of Patent: Jan. 13, 2026

(54) MANUFACTURING METHOD OF THERMAL PASTE

(71) Applicant: ASUSTEK COMPUTER INC., Taipei (TW)

(72) Inventors: Fei Lin Yang, Taipei (TW); Ing-Jer Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 447 days.

(21) Appl. No.: 17/958,025

(22) Filed: Sep. 30, 2022

(65) Prior Publication Data
US 2023/0264261 A1 Aug. 24, 2023

(30) Foreign Application Priority Data
Feb. 18, 2022 (TW) .................................. 111105963

(51) Int. Cl.
| | |
|---|---|
| *B22F 9/08* | (2006.01) |
| *B22F 1/102* | (2022.01) |
| *B22F 1/105* | (2022.01) |
| *B22F 1/14* | (2022.01) |
| *F28F 13/00* | (2006.01) |

(52) U.S. Cl.
CPC ............... *B22F 9/08* (2013.01); *B22F 1/102* (2022.01); *B22F 1/105* (2022.01); *B22F 1/14* (2022.01); *B22F 2301/30* (2013.01); *B22F 2302/45* (2013.01); *F28F 2013/001* (2013.01)

(58) Field of Classification Search
CPC .... B22F 9/08; B22F 1/10; B22F 1/102; B22F 1/103; B22F 1/105; B22F 1/107; B22F 1/108; B22F 1/12; B22F 1/14; B22F 1/142; B22F 1/145; B22F 1/147; B22F 1/148; B22F 1/16; B22F 2009/0804; B22F 2009/0806; B22F 2301/30; B23K 35/24; B23K 35/26; C22C 1/0483; C22C 1/05; C22C 1/1036; C22C 1/1084
USPC ............................................... 252/500–521.6
See application file for complete search history.

(56) References Cited

U.S. PATENT DOCUMENTS

| | | | | |
|---|---|---|---|---|
| 7,025,852 | B2 * | 4/2006 | Kumakura | ............... H01L 24/83 |
| | | | | 525/476 |
| 2001/0038093 | A1 * | 11/2001 | Nguyen | ............... C22C 32/0084 |
| | | | | 252/502 |
| 2004/0041131 | A1 * | 3/2004 | Fukushima | ............... H01B 1/22 |
| | | | | 252/500 |

FOREIGN PATENT DOCUMENTS

| | | | |
|---|---|---|---|
| CA | 2039895 | A1 * | 11/1991 |
| CN | 1071613 | A | 5/1993 |
| CN | 103289650 | A | 9/2013 |
| CN | 103289650 | B | 1/2014 |

(Continued)

OTHER PUBLICATIONS

English machine translation of TW I375713 B of Lin (Year: 2025).*

(Continued)

*Primary Examiner* — Vanessa T. Luk
(74) *Attorney, Agent, or Firm* — MUNCY, GEISSLER, OLDS & LOWE, P.C.

(57) ABSTRACT

A manufacturing method of thermal paste is provided. The manufacturing method includes: providing a base material; heating a metal material to a liquid state, to generate a liquid metal material; sieving the liquid metal material to generate a metal powder material; adding a dispersant to the metal powder material and mixing to generate a mixed powder material; and mixing the mixed powder material and the base material.

5 Claims, 2 Drawing Sheets

(56) References Cited

FOREIGN PATENT DOCUMENTS

| | | | | | |
|---|---|---|---|---|---|
| CN | 104031600 | A | * | 9/2014 | |
| CN | 104031600 | B | | 3/2016 | |
| CN | 108172320 | A | * | 6/2018 | |
| CN | 108624056 | A | * | 10/2018 | ............. C08L 83/04 |
| CN | 111315825 | A | * | 6/2020 | ............. C08K 3/22 |
| CN | 111349423 | A | | 6/2020 | |
| CN | 111940749 | A | * | 11/2020 | |
| CN | 112133901 | A | * | 12/2020 | ............... B22F 9/06 |
| KR | 20180003141 | A | * | 1/2018 | |
| TW | I375713 | B | * | 11/2012 | |

OTHER PUBLICATIONS

English machine translation of CN 111940749 A of Chen (Year: 2025).*
English machine translation of CN 108172320 A of Wang (Year: 2025).*
English machine translation of CN 111315825 A of Iwata (Year: 2025).*
English machine translation of CN 104031600 A of Mei (Year: 2025).*
English machine translation of CN 112133901 A of Huang (Year: 2025).*
English machine translation of KR 2018/0003141 A of Hwang (Year: 2025).*
English machine translation of CN 108624056 A of Qi (Year: 2025).*

* cited by examiner

MANUFACTURING METHOD OF THERMAL PASTE

CROSS-REFERENCE TO RELATED APPLICATION

This application claims the priority benefit of Taiwan application serial No. 111105963, filed on Feb. 18, 2022. The entirety of the above-mentioned patent application is hereby incorporated by reference herein and made a part of the specification.

BACKGROUND OF THE INVENTION

Field of the Invention

The disclosure relates to a manufacturing method of thermal paste.

Description of the Related Art

As sizes of chips and electronic components continuously shrink, heat dissipation has become an important issue for electronic devices.

In the current common heat dissipation technology, high heat generated during an operating process of an electronic component is transferred to a metal heat dissipation fin to be dissipated in a thermal conduction manner. In order to prevent an air gap from being generated at a junction between the metal heat dissipation fin and the electronic component to affect heat dissipation effects, thermal paste is usually filled in the junction to avoid generating the air gap.

Because the thermal paste is mainly made of silicone resin, the thermal conduction capability of the thermal paste is limited. In order to improve the thermal conduction capability of the thermal paste, liquid metal thermal paste mainly made of a liquid metal material appears on the market. A phase change endothermic characteristic of the liquid metal is used to improve heat dissipation efficiency thereof. However, such liquid metal thermal paste is expensive, and difficult to be uniformly coated on a joint surface.

BRIEF SUMMARY OF THE INVENTION

The disclosure provides a manufacturing method of thermal paste. The manufacturing method includes: providing a base material; heating a metal material to a liquid state, to generate a liquid metal material; sieving the liquid metal material to generate a metal powder material; adding a dispersant to the metal powder material and mixing to generate a mixed powder material; and mixing the mixed powder material and the base material.

By using the manufacturing method of thermal paste according to the disclosure, low-melting point metal powder is uniformly mixed in the base material of the thermal paste, so as to improve the overall thermal conduction capability of the thermal paste, which is also convenient for coating and using. In addition, because the thermal paste is mainly composed of a non-metallic base material, insulation performance of the thermal paste is ensured.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
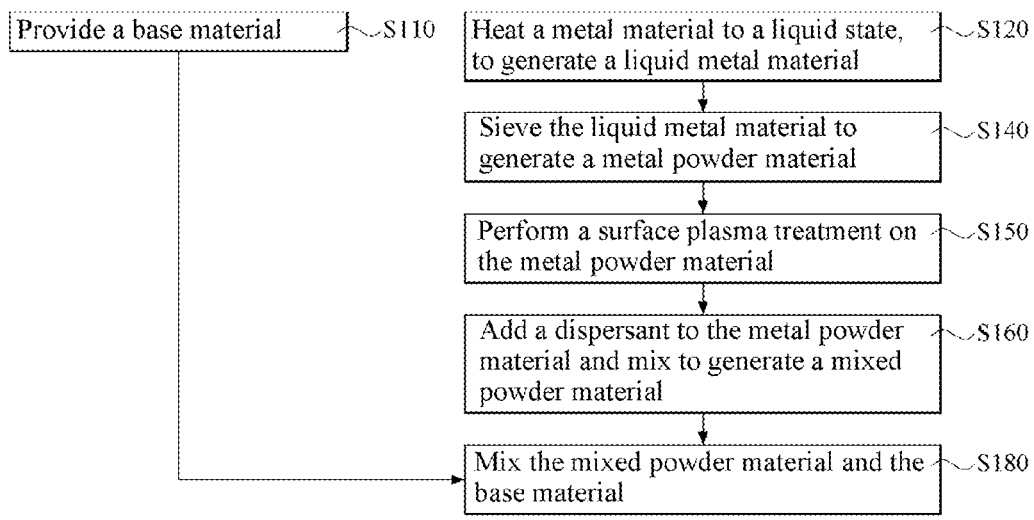
FIG. 1 is a flowchart of a manufacturing method of thermal paste according to an embodiment of the disclosure.

FIG. 1 is a flowchart of a manufacturing method of thermal paste according to an embodiment of the disclosure.

First, as described in step S110, a base material is provided. In an embodiment, the base material is composed of a silicone material and a solvent. In an embodiment, the base material is composed of a silicone material, a thermally conductive particle material and a solvent. The thermally conductive particle material is an additive used for improving a thermal conduction effect. In an embodiment, the thermally conductive particle material is aluminum nitride, boron nitride, aluminum oxide, copper oxide, or the like.

Then, as described in step S120, a metal material is heated to a liquid state, to generate a liquid metal material. The metal material is a metal material with a melting point lower than 300 degrees Celsius. In an embodiment, the metal material is selected from a group composed of a gallium indium tin (Ga—In—Sn) alloy material, an indium tin (In—Sn) alloy material, a gallium aluminum (Ga—Al) alloy material, a gallium bismuth (Ga—Bi) alloy material, a gallium tin (Ga—Sn) alloy material and a gallium indium (Ga—In) alloy material.

As described in step S140, the liquid metal material is sieved to generate a metal powder material. In an embodiment, the step of sieving the liquid metal material is using a screen to sieve the liquid metal material, and cooling the sieved liquid metal material, to generate the metal powder material. The screen is a stainless steel screen.

In an embodiment, a mesh of the screen used in step S140 ranges from 300 to 1000, to generate metal powder with a particle size approximately ranging from 30 to 40 microns, so as to ensure that the liquid metal material is smoothly sieved, and prevent the particle size of the metal powder material generated after sieving from being too large to affect a thermal conduction effect of the thermal paste.

As described in step S150, a surface plasma treatment is performed on the metal powder material. In this step, static electricity carried by the metal powder is effectively removed, to prevent caking of the metal powder.

As described in step S160, a dispersant is added to the metal powder material and mixed to generate a mixed powder material.

In an embodiment, the dispersant is a layered silicate clay material. The layered silicate clay material is filled among the metal powder, to prevent caking of the metal powder. In an embodiment, the dispersant is a fluororesin material. The fluororesin material reduces a surface tension among the metal powder materials, and prevents caking of the metal powder. Because the layered silicate clay material and the fluororesin material have different mechanisms of preventing caking of the metal powder, in an embodiment, both the layered silicate clay material and the fluororesin material are mixed into the metal powder material as the dispersant, to avoid caking of the metal powder.

The foregoing step of adding the dispersant to the metal powder material and mixing includes grinding and mixing the metal powder material and the dispersant. In an embodiment, the metal powder material and the dispersant are ground and mixed by using a device used for mixing such as a ball mill or a roller mill.

As described in step S180, the mixed powder material and the base material are mixed. In an embodiment, the foregoing step of mixing the mixed powder material and the base material includes grinding and mixing the mixed powder material and the base material. In an embodiment, the metal powder material and the dispersant are ground and mixed by using a device used for mixing such as a ball mill or a roller mill.

Figure 2:
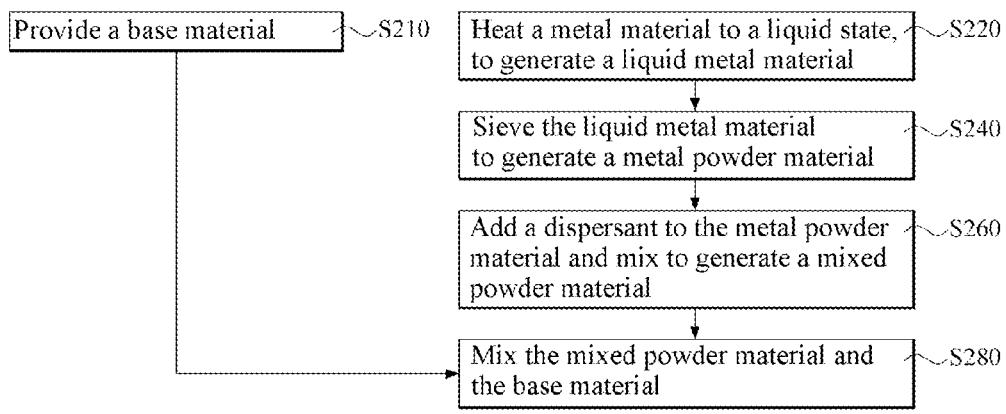
FIG. 2 is a flowchart of a manufacturing method of thermal paste according to another embodiment of the disclosure.

FIG. 2 is a flowchart of a manufacturing method of thermal paste according to another embodiment of the disclosure.

A main difference between this embodiment and the embodiment in FIG. 1 is that step S150 in the manufacturing method of thermal paste in FIG. 1 is omitted in this embodiment. In the manufacturing method of thermal paste according to this embodiment, after the step of sieving the liquid metal material to generate the metal powder material (that is, step S240 in the figure), a dispersant is directly added to the metal powder material and mixed to generate a mixed powder material (that is, step S260 in the figure).

Other steps such as steps S210, S220 and S280 in this embodiment are similar to steps S110, S120 and S180 in the embodiment in FIG. 1. Details are not described herein.

The following table lists improvement in thermal conductivity (K) of thermal paste in three different formulations. A gallium indium tin alloy added in the three formulations is a gallium indium tin eutectic alloy with a brand name of Galinstan. Differences among the three formulations are presented in the table by using weight percentages. The thermal paste in the three formulations is manufactured by using the manufacturing method of thermal paste in FIG. 1.

| Formulation | I | II | III | Conventional thermal paste |
|---|---|---|---|---|
| Silicone resin | 87% | 83% | 76% | 100% |
| Gallium indium tin alloy (Galinstan) | 9% | 13% | 20% | |
| Metal additive | 2.5% | 2.5% | 2.5% | |
| Layered silicate clay material and solvent | 1% | 1% | 1% | |
| Fluororesin material | 0.05% | 0.05% | 0.05% | |
| Thermal conductivity (K) W/mK | 1.93 | 2.02 | 2.2 | 1.5-1.8 |

As shown in the table, by using the manufacturing method of thermal paste according to the disclosure, metal powder materials of metal materials (such as the gallium indium tin alloy in the table) are effectively manufactured, and uniformly mixed into the silicone resin. Therefore, as the proportion of the gallium indium tin alloy increases, the overall thermal conductivity of the thermal paste material also significantly rises.

By using the manufacturing method of thermal paste according to the disclosure, low-melting point metal powder is uniformly mixed in the base material of the thermal paste, so as to improve the overall thermal conduction capability of the thermal paste, which is also convenient for coating and using. In addition, because the thermal paste is mainly composed of a non-metallic base material, insulation performance of the thermal paste is ensured.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A manufacturing method of thermal paste, comprising:
providing a base material;
heating a metal material to a liquid state, to generate a liquid metal material;
sieving the liquid metal material and cooling the sieved liquid metal material to generate a metal powder material;
adding a dispersant to the metal powder material and mixing to generate a mixed powder material; and
mixing the mixed powder material and the base material;
wherein the dispersant comprises a layered silicate clay material and a fluororesin material;
wherein the base material is composed of a silicone material, a thermally conductive particle material and a solvent;
wherein the thermally conductive particle material is selected from a group composed of aluminum nitride, boron nitride, aluminum oxide, and copper oxide;
wherein the metal material is selected from a group composed of a gallium indium tin alloy material, an indium tin alloy material, a gallium aluminum alloy material, a gallium bismuth alloy material, a gallium tin alloy material and a gallium indium alloy material.

2. The manufacturing method of thermal paste according to claim 1, wherein the step of sieving the liquid metal material is using a screen to sieve the liquid metal material, a mesh of the screen ranges from 300 to 1000.

3. The manufacturing method of thermal paste according to claim 1, wherein before the step of adding the dispersant to the metal powder material and mixing, the manufacturing method further comprises performing a surface plasma treatment on the metal powder material.

4. The manufacturing method of thermal paste according to claim 1, wherein the step of adding the dispersant to the metal powder material and mixing comprises grinding and mixing the metal powder material and the layered silicate clay material.

5. The manufacturing method of thermal paste according to claim 1, wherein the step of mixing the mixed powder material and the base material comprises grinding and mixing the mixed powder material and the base material.

\* \* \* \* \*